Figure 1:
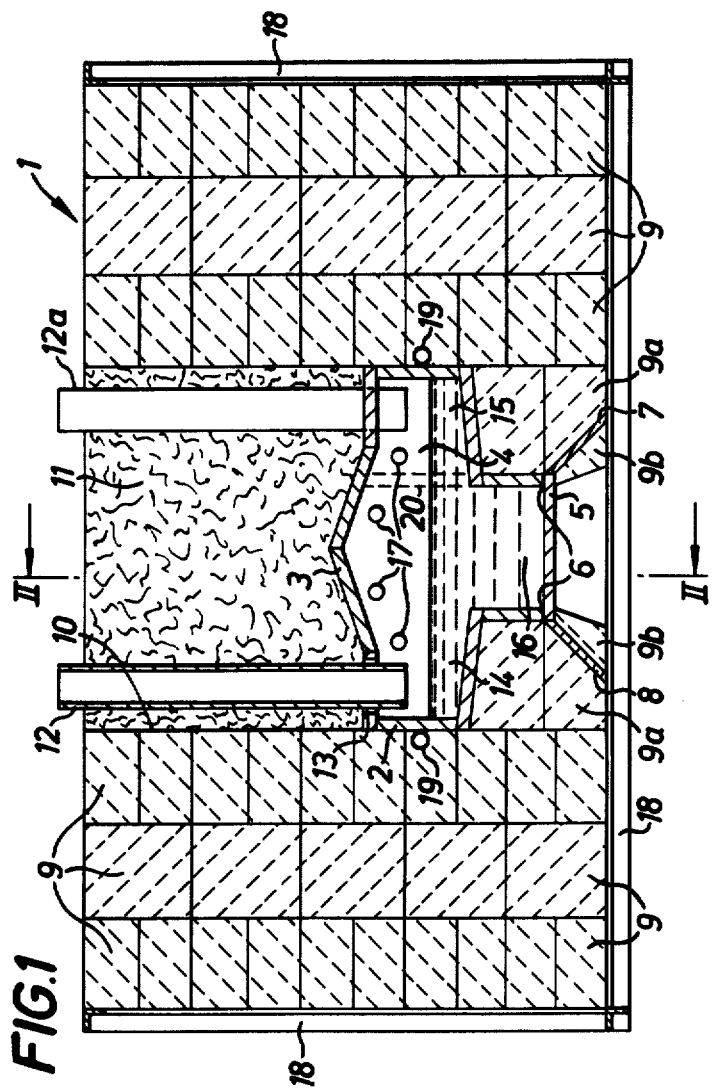

United States Patent [19]
Jaray

[11] 3,918,946
[45] Nov. 11, 1975

[54] GLASS-SPINNING APPARATUS

[75] Inventor: Francis Ferdinand Jaray, Martley, England

[73] Assignee: Glass Fibres and Equipment Limited, Worcestershire, England

[22] Filed: Jan. 22, 1974

[21] Appl. No.: 435,423

[30] Foreign Application Priority Data
Feb. 1, 1973 United Kingdom............... 5009/73
Feb. 3, 1973 United Kingdom............... 5480/73

[52] U.S. Cl. ........................... 65/1; 65/12; 65/355; 65/356
[51] Int. Cl............................................ C03b 37/02
[58] Field of Search ............... 65/1, 2, 12, 355, 356

[56] References Cited
UNITED STATES PATENTS
2,794,058 5/1957 Russell............................. 65/356 X
3,778,282 10/1966 Jaray................................ 65/1
3,802,857 4/1974 Gerlach............................ 65/1

*Primary Examiner*—Robert L. Lindsay, Jr.
*Attorney, Agent, or Firm*—Michael S. Striker

[57] ABSTRACT

In a glass-spinning apparatus comprising a vessel, open at the bottom, for containing glass material, a perforated bottom plate upon which the open bottom portion of the vessel rests, and heating means for heating the glass material in the vessel to a molten state so that it flows through the perforations in the bottom plate and then solidifies to form a bundle of glass fibres, there is provided heat insulating means which is permeable to molten glass and which surrounds the juncture between confronting portions of the perforated bottom plate and the vessel, the heat insulating means being dimensioned so that, in use of the apparatus, molten glass escaping from the apparatus through said juncture penetrates the heat insulating means but solidifies therein before reaching the outwardly facing surface(s) thereof. The heat insulating means may be made from a material which is itself permeable to molten glass. In addition, or alternatively, the heat insulating means may be made from a plurality of pieces of insulating material, which are assembled together so that molten glass escaping through said juncture can penetrate gaps between adjacent pieces of insulating material.

23 Claims, 2 Drawing Figures

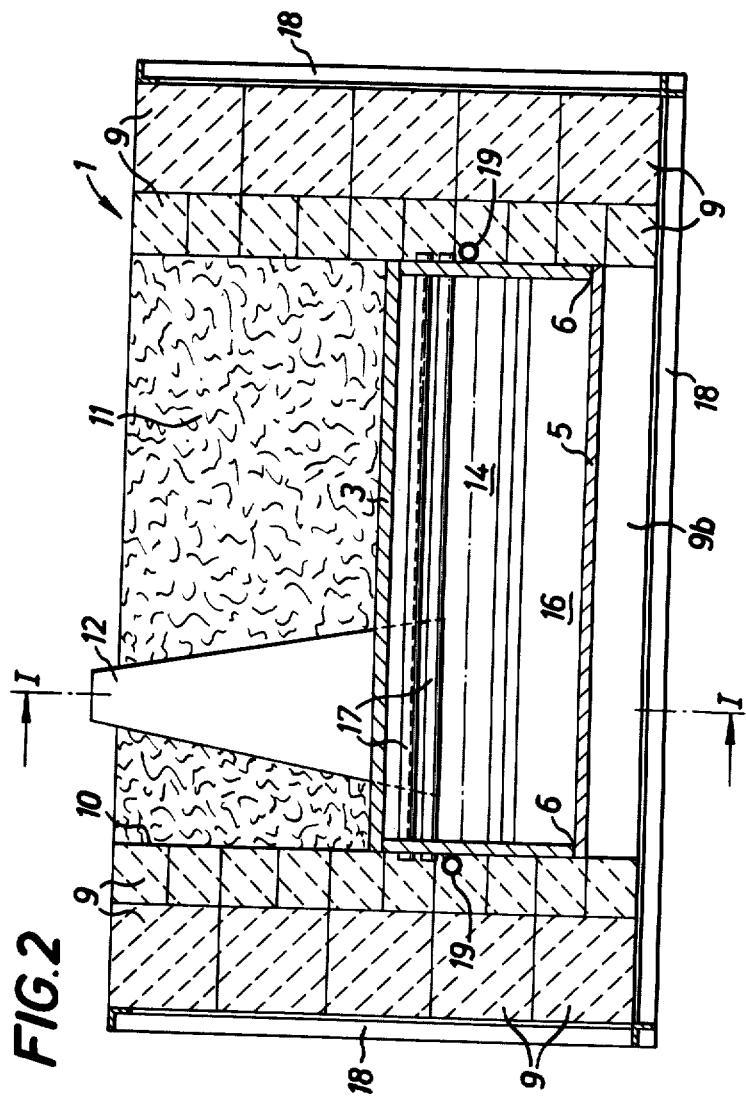

GLASS-SPINNING APPARATUS

This invention relates to a glass-spinning apparatus for the production of glass fibres.

It is customary to produce glass fibres by drawing molten glass through small perforations formed in the bottom of a crucible of platinum or other refractory metallic or other material. Such materials are not only expensive to manufacture but also suffer from the disadvantage that erosion of either the body or the perforated parts of the crucible renders the whole crucible useless. It has been proposed to have a crucible comprising a ceramic body part and a metal drawbar which is cemented to the body part. However, in view of the differential thermal expansion, such an arrangement is not satisfactory. It will be appreciated that fracture of the cement joint or even the crucible body part would lead to flooding with molten glass of at least the underside of the drawbar.

The present invention seeks to provide a glass-spinning apparatus which does not have the disadvantages mentioned above, which is cheap to manufacture and which is economical in use.

According to the present invention a glass-spinning apparatus comprises a vessel open at the bottom, for containing glass material, a perforated bottom plate upon which the open bottom portion of the vessel rests, heat insulating means which is permeable to molten glass and which surrounds the juncture between confronting portions of the perforated bottom plate and the vessel and heating means for heating the glass material in the vessel to a molten state so that it flows through the perforations in the bottom plate and then solidifies to form a bundle of glass fibres, the heat insulating means being dimensioned so that, in use of the apparatus, molten glass escaping from the vessel through said juncture penetrates the heat insulating means but solidifies therein before reaching the outwardly facing surface(s) thereof.

The heat insulating means may be made from a material which is itself permeable to molten glass. Alternatively, the heat insulating means may be made from small pieces of material, which may or may not be permeable to molten glass, which are assembled together with unavoidable gaps between adjacent pieces into which molten glass escaping through said juncture may penetrate. Preferably, the second heat insulating means is made of refractory material.

The vessel is preferably made of highly refractory material, for example alumina, zirconia, Sillimanite or mullite, or a heat-resistant alloy. The vessel may be made in one piece or it may be assembled from a plurality of suitably shaped pieces. In the latter case, the pieces may be loosely assembled together so that molten glass in the vessel can escape through the wall of the vessel. When the vessel is permeable to molten glass in this way, it is of course necessary for the heat insulating means to surround the permeable parts of the vessel as well as said juncture.

Preferably, the vessel is shaped so that the cavity therein has the sectional shape, in a vertical plane, of an inverted L or of a T, so that the cavity has either one or two pre-melting sections and a deeper clarifying section.

The bottom plate may be formed from a refractory metallic material, for example chrome, iron and nickel alloys or platinum, or from a ceramic material. The bottom plate is may be electrically heated by passing an electric current therethrough. If, in this case, the bottom plate is made from a ceramic material, the latter should be made of a semiconductor material, for example carbon silicide.

Preferably, the bottom plate is of substantially rectangular shape and has a flange secured to each of two opposed edges, each flange being downwardly inclined in the direction away from the bottom plate in order to prevent molten glass, which escapes from said juncture when the apparatus is in use, from interfering with the glass fibres drawn from the bottom plate.

The vessel is preferably closed at its upper end by second heat insulating means, which may be in the form of a cover surmounted by fibrous refractory material, for example the material sold under the Trade Mark "Kaowool".

The invention will now be described, by way of example, with reference to the accompanying drawing, in which FIG. 1 is a schematic sectional view taken along the line I—I of FIG. 2, through one embodiment of glass spinning apparatus in accordance with the invention, and FIG. 2 is a section taken along the line II—II of FIG. 1.

The drawing shows a glass-spinning apparatus, generally designated by the reference numeral 1, comprising a vessel in the form of a crucible 2 constructed from tiles or slabs of refractory material, the crucible being open at its bottom. The crucible is provided with a cover 3 and has an elongate cavity 4 therein which, in a vertical transverse plane, has a T-shaped section.

The crucible 2 rests on a substantially horizontally disposed, perforated, rectangular bottom plate 5 in such a way that the plate 5 completely covers the opening at the bottom of the crucible. Flanges 7 and 8 are secured to each of the two opposed long edges of the plate 5 and incline downwardly therefrom.

Heat insulating means in the form of refractory blocks 9 surrounds the juncture 6 between confronting portions of the plate 5 and the walls of the crucible 2. The heat insulating means also surrounds the walls of the crucible 2 and extends above the crucible. A channel 10 in this upper part of the heat insulating means provides access to the crucible 2, this channel being filled, when the appapratus is in use, with second insulating means in the form of fibrous refractory material 11.

Verically-disposed conduits 12 and 12a of refractory material pass down through the channel 10 and through openings 13 in the cover 3. These conduits serve for supplying glass, for example in the form of marbles or cullet, to pre-melting sections 14 and 15 in the cavity 4 of the crucible, these sections 14, 15 being disposed one on each side of a deeper clarifying section 16 of the cavity.

Four radiant electric heating elements 17, supported in the end walls of the crucible 2, extend through the cavity 4 and serve to melt the glass delivered to the pre-melting sections 14 and 15 and to maintain the glass in a molten state in the section 16.

The blocks 9 forming the heat insulating means are supported in a framework 18, made for example of angle sections. The apparatus is assembled by first assembling the lowermost layer of blocks 9 in the framework and mounting the bottom plate 5, with its flanges 7 and 8, thereon. This lowermost layer of blocks includes the specially shaped blocks 9a and 9b having inclined faces between which the flanges 7 and 8 are received. Further layers of the blocks 9 are then built up on the lowermost layer, and at the same time the crucible 2 is assembled from the slabs or tiles.

In use of the above-described apparatus, glass in the form of marbles and/or cullet, is fed through the conduits 12 and 12a to the pre-melting sections 14 and 15 of the cavity 4. The floor of each of these sections is normally inclined downwardly in the direction towards the clarifying section 16, the glass not passing into the section 16 until it has been melted by the heat radiated from the heating elements 17. The hot molten glass flows out of the sections 14, 15 into the section 16 and runs out through the perforations in the bottom plate 5 where it solidifies to form a bundle of glass fibres in the usual manner.

Since the crucible 2 only rests on the plate 5, molten glass oozes out from the juncture 6 and solidifies in the permeable refractory blocks 9 and/or the gaps between adjacent blocks 9 before reaching the outwardly facing surfaces of the heat insulating means. The flanges 7 and 8 secured to the bottom plate help to prevent molten glass from wetting the underside of the plate 5 and thus interfering with the bundle of glass fibres.

Since the crucible 2 is constructed of a plurality of slabs or tiles of refractory material, the molten glass also oozes from the gaps between adjacent slabs or tiles and solidifies at a distance from the crucible 2 in the blocks 9 and/or in gaps between adjacent blocks before reaching the outwardly facing surfaces of the heat insulating means. In this way, the crucible 2 and the bottom plate 5 "float" together in the molten glass and are only held down by their own weight. Any differential expansion between the crucible 2 and the bottom plate 5 can therefore easily take place since there is a liquid joint of molten glass therebetween.

In order to help maintain the glass in its molten state as it passes through the perforated plate 5, it is possible to pass an electric heating current through the plate. In order to reduce thermal losses to a minimum, the plate 5 and the flanges 7 and 8 should be designed to discourage the electric current from passing through the flanges 7 and 8. This may be done by making the flanges 7 and 8 of thinner material than the plate 5 and/or by forming deep longitudinal and/or transverse grooves (not shown) in the flanges 7 and 8 to increase their electrical resistance. In one embodiment of the apparatus shown in the drawing, the bottom plate 5 has a thickness of from 2 to 10 mm whilst the flanges 7 and 8 have a thickness of from 0.25 to 1 mm. Since the plate 5 will attain a much higher temperature than the two flanges 7 and 8, it is advisable to provide transverse corrugations (not shown) in the flanges to compensate for the differential thermal expansion.

During the production of glass fibre in the apparatus 1 it is preferred to maintain the level of the molten glass in the crucible 2 at a substantially constant height by feeding glass into the pre-melting sections 14 and 15 at substantially the same rate as molten glass flows through the perforated plate 5. In this way, the "three-phase line" (by which is meant the line along the inside of the walls of the vessel or crucible 2 where the molten glass is in contact with the atmosphere above the molten glass) is maintained at a substantially constant level in the cavity 4 throughout a period of spinning glass fibres. Since glass is continually being supplied to and withdrawn from the crucible 2 and since there are temperature differences in the molten glass, currents are set up in the molten glass in the crucible. These currents are strongest in the region of the three-phase line and have an eroding action on the walls of the crucible 2. This can be counteracted in one or more of several ways. For example, the crucible 2 may be made so that it has a more highly erosion-resistant zone in the region of the three-phase line, for example the tiles or slabs in this region may be made of or faced with chromic oxide whereas the tiles or slabs above and below the region may be made of a cheaper and less erosion-resistant material, for example alumina or zirconia. Another way is to make the wall of the crucible thicker in the region of the three-phase line and to design the cavity 4 in such a way that the molten glass in the region of the three-phase line is shaded from direct irradiation from the heating elements 17. Cooling of the molten glass in the region of the three-phase line may also be effected by passing cooling fluid through piping 19 arranged on the outside of the crucible at the level of the three-phase line. In this way the circulation of the molten glass is reduced in the region of the three-phase line as the glass becomes more viscous so that the concomitant erosion is largely eliminated.

In known manner, the perforations in the bottom plate 5 may be in the form of very fine holes through the plate, or of nipples with very fine holes therethrough screwed or otherwise secured in holes in the plate. These perforations are of too small a diameter to be shown in the drawing.

In another embodiment of the invention the cavity 4 may have a section in a vertical plane which is of inverted L-shape. Typically in this case the crucible 2 is only provided with one pre-melting section 14, the walls of the vessel 2 forming the other pre-melting section 15 being replaced by a wall 20 (shown in broken lines in FIG. 1). Furthermore, in this embodiment of the invention, the space occupied by the pre-melting section 15 in FIG. 1 is filled with further blocks 9 (not shown), and the rightmost heating element 17 and conduit 12a are omitted. Again, instead of being made of slabs or tiles, the crucible 2 may have a monolithic structure, being moulded in a suitable refractory material.

I claim:

1. A glass-spinning apparatus, particularly for spinning glass fibers, comprising a vessel adapted to contain glass material and having an open bottom portion; a perforated bottom plate abutting said open bottom portion and defining an unsealed juncture therewith; heating means for heating the glass material contained in said vessel to a molten state so that the molten glass flows through the perforations in said bottom plate and thereupon solidifies to form a bundle of glass fibers; and heat-insulating means permeable to molten glass and surrounding said juncture and having an outwardly facing surface, said heat-insulating means receiving the molten glass escaping from said vessel through said juncture and being dimensioned so that the molten glass which permeates said insulating means solidifies therein in a region remote from said juncture and also spaced from said outwardly facing surface.

2. Apparatus according to claim 1, in which said heat insulating means is made from a material which is itself permeable to molten glass.

3. Apparatus according to claim 1, in which said heat insulating means is made from a plurality of pieces of insulating material, which are assembled together so that molten glass escaping through said juncture can penetrate gaps between adjacent pieces of insulating material.

4. Apparatus according to claim 1, in which said heat insulating means is made of a refractory material.

5. Apparatus according to claim 1, in which said vessel has a cavity which, in a vertical plane, has a section which is T-shaped, thereby dividing the cavity into two pre-melting sections in which the glass material is intended to be melted and a clarifying section disposed between and deeper than the pre-melting sections, said clarifying section being directly above said bottom plate.

6. Apparatus according to claim 1, in which said vessel has a cavity which, in a vertical plane, has a section which is of inverted L-shape, thereby dividing the cavity into a pre-melting section in which the glass material is intended to be melted and a deeper clarifying section disposed above said bottom plate.

7. Apparatus according to claim 5, in which each of said pre-melting sections has a bottom and is inclined downwardly in the direction towards said clarifying section.

8. Apparatus according to claim 5, in which said heating means is positioned in said cavity to heat each of said pre-melting sections more intensely than said clarifying section.

9. Apparatus according to claim 5, and further comprising means for feeding solid glass material to each of said pre-melting section.

10. Apparatus according to claim 1, in which said bottom plate is of substantially rectangular shape.

11. Apparatus according to claim 1, in which said bottom plate is made of an electrically conducting or semi-conducting material.

12. Apparatus according to claim 1, in which said bottom plate is made of refractory metallic material.

13. Apparatus according to claim 1, in which the perforations in said bottom plate are provided by holes in said bottom plate.

14. Apparatus according to claim 1, in which said heating means comprises radiant heating elements.

15. Apparatus according to claim 1, in which said vessel is a monolithic structure of refractory material.

16. Apparatus according to claim 1, in which said vessel is assembled from a plurality of separate pieces of refractory material defining a wall.

17. Apparatus according to claim 16, in which said heat insulating means also surrounds said wall of said vessel.

18. Apparatus according to claim 1, in which in the region of its 3-phase line said vessel is made with a material having higher erosion resistance to the molten glass than the remainder of said vessel.

19. Apparatus according to claim 1, in which in the region of its 3-phase line said vessel is shielded from direct irradiation by said heating means.

20. Apparatus according to claim 1, and further comprising for cooling said vessel in the region of its 3-phase line.

21. Apparatus according to claim 1, and further comprising heat insulating means provided above said vessel.

22. Apparatus according to claim 21, in which said second heat insulating means comprises fibrous refractory material.

23. Apparatus according to claim 13, in which said holes are adapted to have nipples mounted therein.

* * * * *